United States Patent [19]

Casey et al.

[11] Patent Number: 5,134,837
[45] Date of Patent: Aug. 4, 1992

[54] CROP PICKUP AND SEED HARVESTING DEVICE

[76] Inventors: Omer L. Casey; Gordon G. Casey; Larry L. Casey, all of County 15th St. & Ave. C, Somerton, Ariz. 85350

[21] Appl. No.: 575,822

[22] Filed: Aug. 31, 1990

[51] Int. Cl.[5] ............................................. A01D 87/10
[52] U.S. Cl. ...................................... 56/12.8; 56/130; 56/321; 56/DIG. 8
[58] Field of Search ...................... 56/12.8, 12.9, 126, 56/130, 321, DIG. 8

[56] References Cited

U.S. PATENT DOCUMENTS

| | | | |
|---|---|---|---|
| 1,122,375 | 12/1914 | Engle | 56/12.9 |
| 2,670,586 | 3/1954 | Phillips | 56/DIG. 8 |
| 2,780,046 | 2/1957 | Edwards | 56/DIG. 8 |
| 4,303,373 | 12/1981 | Polhemus | 56/12.8 |
| 4,730,444 | 3/1988 | Leffel et al. | 56/13.1 |
| 4,790,128 | 12/1988 | Klinner | 56/DIG. 1 |

Primary Examiner—Ramon S. Britts
Assistant Examiner—Roger J. Schoeppel
Attorney, Agent, or Firm—Fleit, Jacobson, Cohn, Price, Holman & Stern

[57] ABSTRACT

A crop pickup device including a rotatable drum or cylinder with pickup teeth thereon associated with a rake plate or notched stripping panel associated with the pickup teeth to effectively strip the plants from the pickup and collect and guide the seeds which may fall from the plants into the conveyor of the harvesting machine. A transverse manifold with a rearwardly facing slot-like opening is located forwardly of the pickup drum and teeth to prevent the plants from rolling forwardly when they are engaged by the pickup teeth and a pair of side blowers discharge air laterally inwardly and rearwardly which also prevent the plants from rolling forwardly and keep the windrow from fanning out or rolling outside of the pickup drum and teeth. The stripping panel and pickup teeth are constructed of a plastic material which provides self-lubricating qualities to enable a close fitting relation between the teeth and slots and the area of the panel having the slots therein is upwardly inclined and the area between the slots is recessed to form a longitudinal groove-like structure to guide seeds rearwardly toward the auger of the harvesting machine.

3 Claims, 2 Drawing Sheets

CROP PICKUP AND SEED HARVESTING DEVICE

BACKGROUND OF THE INVENTION

1. Field of the Invention

A crop pickup device for use in association with an auger construction for harvesting valuable seed crops such as sesame seed, various types of grass seeds, spice seeds, mustard seeds and the like. The crop pickup device is used in association with a harvesting machine having an auger thereon and picks up dried plants with seeds attached thereto from a windrow with the pickup device including a rotatable drum or cylinder with pickup teeth thereon associated with a rake plate or notched stripping panel associated with the pickup teeth to effectively strip the plants from the pickup teeth and collect and guide any seeds which may fall from the plants into the conveyor of the harvesting machine. A transverse manifold with a rearwardly facing slot-like opening is located forwardly of the pickup drum and teeth to prevent the plants from rolling forwardly when they are engaged by the pickup teeth and a pair of side blowers discharge air laterally inwardly which also prevent the plants from rolling forwardly and keep the windrow from fanning out or rolling outside of the pickup drum and teeth. The stripping panel is constructed of a plastic along with the pickup teeth which provides self-lubricating qualities to enable a close fitting relation between the teeth and slots. The area of the panel having the slots therein is upwardly inclined and the area between the slots is recessed to form a longitudinal groove-like structure to guide seeds rearwardly toward the auger of the harvesting machine.

2. Description of the Prior Art

Various types of crop pickup devices are known in which crops deposited in windrows are picked-up and harvested. In harvesting certain crops, the plants are quite dry and brittle and the seeds have a tendency to easily fall from the plant. To avoid substantial loss of seeds, the dried plants are usually cut by hand and placed in a windrow by hand to avoid loss of seeds due to the conventional cutting and windrowing operation. The following U.S. Pat. Nos. relate to this field of endeavor.

1,134,443
2,710,516
2,990,019
3,073,098
3,165,874
3,193,995
3,456,652
3,665,687
3,693,331
3,720,050
3,760,573
3,828,531
3,964,245
4,364,222
4,406,112
4,730,444

The above patents disclose various structures in which a stream of air is associated with the crop pickup head of a harvester to facilitate crop pickup and conveyance. U.S. Pat. No. 4,730,444 relates to a crop pickup mechanism for use with a harvester to pickup dry plants with seeds by forming an upper and lower air seal with the upper air seal being disposed forwardly and above a rotating pickup drum and the bottom air seal being disposed rearwardly of and below the pickup drum with a downwardly and forwardly inclined slotted rake plate or stripping plate 6 with a plurality of air nozzles and other structural components facilitating crop pickup. However, this patent and none of the others listed above disclose a structure equivalent to the present invention.

SUMMARY OF THE INVENTION

An object of the present invention is to provide a crop pickup device associated with a harvester and which includes a generally horizontally disposed, transversely extending, rotatably driven pickup drum having a plurality of radial pickup teeth mounted thereon combined with a transversely extending air manifold communicated with a blower structure in which the manifold includes a rearwardly facing discharge nozzle positioned forwardly and above the pickup drum to prevent the plants being picked up from rolling forwardly when engaged by the pickup teeth which lift the plants over the pickup drum with the air stream also serving to assist in propelling the plants and seeds over the pickup drum into the harvester.

Another object of the invention is to provide a crop pickup device in accordance with the preceding object combined with a pair of side blowers discharging air rearwardly and inwardly in front of the pickup drum to prevent rolling of the plants in the windrow and to prevent the windrow of plants from spreading laterally from the windrow thereby retaining the plants for engagement by the pickup teeth and assisting in movement of the plants and seeds thereon over the pickup drum.

A further object of the invention is to provide a crop pickup device which includes a stripping panel or rake plate having its forward end located adjacent the drum and being upwardly inclined with the stripping panel including longitudinal slots therein closely receiving the pickup teeth at the rear of the pickup drum with the stripping panel being constructed of plastic having self-lubricating qualities to facilitate movement of the pickup teeth therethrough and removal of the plants from the pickup teeth with the areas between the slots including an upwardly facing groove or recess inclined downwardly and rearwardly to receive small seeds dislodged from the plants thereby facilitating transfer into the harvesting machine auger.

Still another object of the present invention is to provide a crop pickup device located at the forward end of a harvester which will effectively pickup dried plants with small seeds in their seed pods that are prone to becoming dislodged when the plants are subjected to normal harvesting procedures with the crop pickup device lifting the dried plants from the windrow onto a panel which feeds the plants into the auger of a harvesting machine with the pickup device efficiently picking up the plants with minimum loss of valuable seeds.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
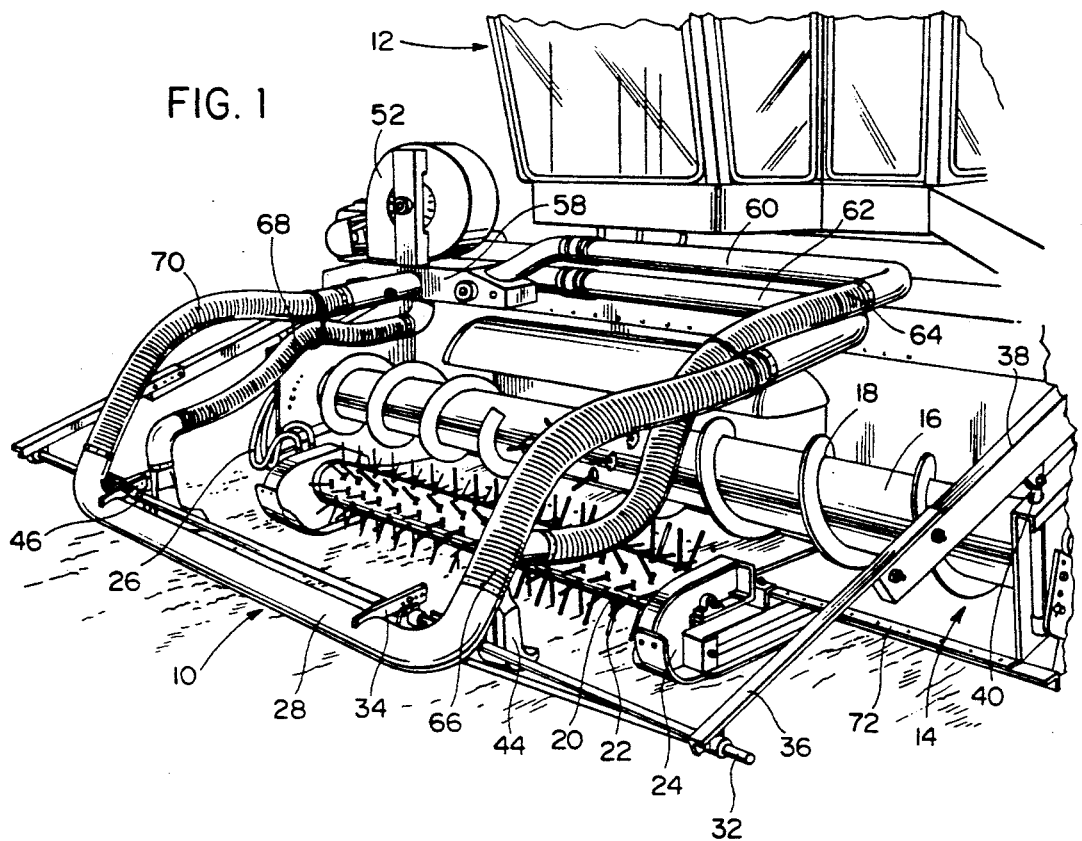
FIG. 1 is a perspective view of the crop pickup device of the present invention associated with a harvester.

Referring now specifically to the drawings, the crop pickup device of the present invention is generally designated by reference numeral 10 and is illustrated in association with a self-propelled harvester generally designated by the numeral 12 which includes a crop pickup attachment 14 at the forward end thereof that includes a transversely extending auger 16 having spiral flights 18 extending inwardly from each end thereof to the center for discharging the crop picked up from a windrow into the harvester all of which represents conventional structure.

The crop pickup device 10 of the present invention includes a horizontally disposed, rotatably driven, transversely extending pickup drum 20 of cylindrical configuration provided with a plurality of radially extending teeth 22 mounted thereon in staggered longitudinally extending rows. The ends of the drum 20 are journaled in skid-like support structures 24 with one end of the drum being driven by a hydraulic motor supplied power through hoses 26 which is a conventional structure for supporting and driving a pickup drum 20 in which the pickup drum 20 in and of itself is a conventional component associated with a crop pickup attachment 14. The skid supports 24 maintain the drum 20 in spaced relation to the ground surface in order to pick up plants from a windrow as the harvester machine and crop pickup device are advanced.

Figure 2:
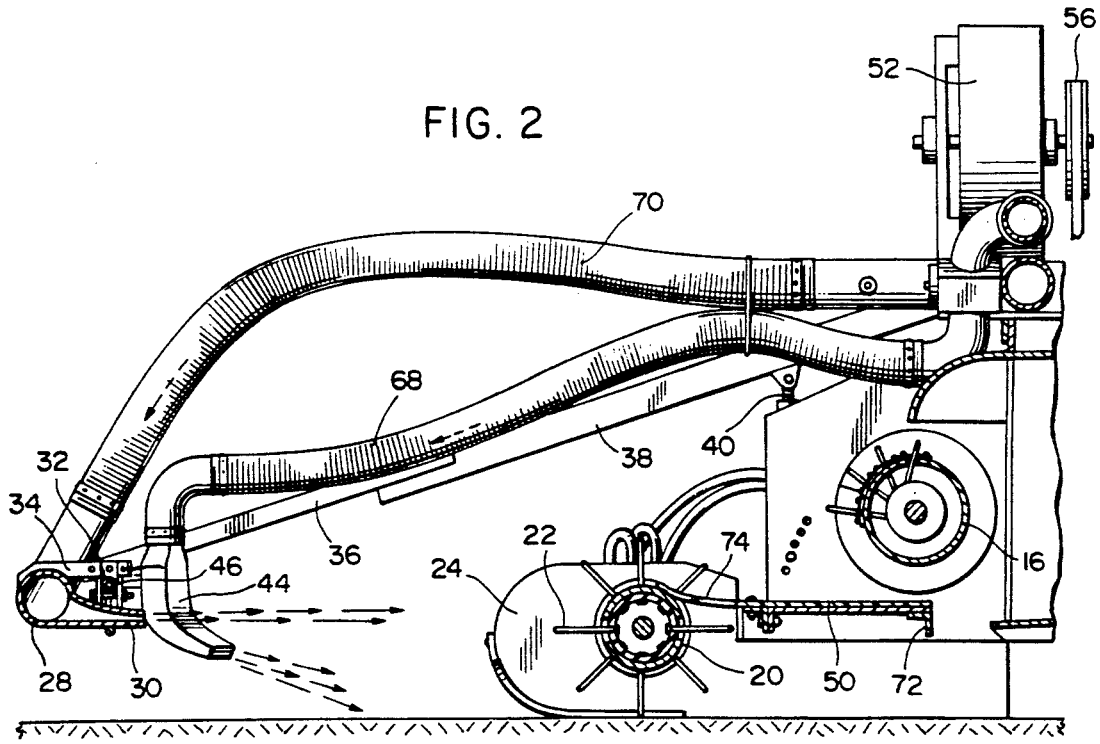
FIG. 2 is a longitudinal sectional view of the crop pickup device.
Figure 3:
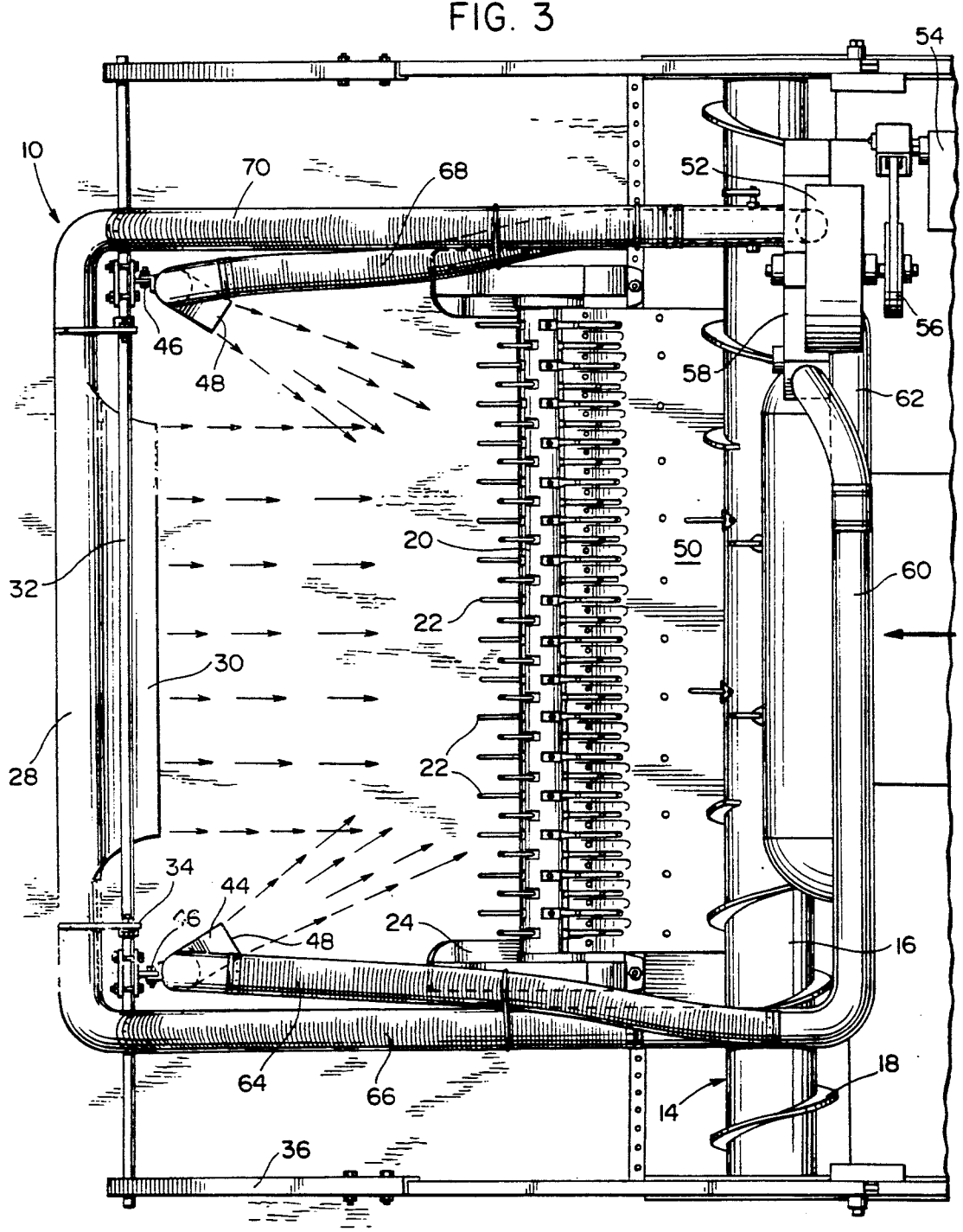
FIG. 3 is a top plan view of the crop pickup device.

Positioned forwardly of the drum 20 is a transversely extending, horizontally disposed air manifold 28 in the form of a cylindrical pipe having a rearwardly extending, generally horizontally disposed discharge nozzle 30 which extends rearwardly in horizontal direction toward the drum 20 and has an overall length only slightly less than the length of the pickup drum 20 as illustrated in FIG. 3. FIG. 2 illustrates the air being discharged from the nozzle 30 toward the pickup drum 20. The manifold is supported from a transverse support rod 32 having brackets 34 connecting the manifold 28 to the rod 32. The outer ends of the rod 32 are supported by rearwardly extending support members 36 attached to rearwardly extending support arms 38 that can be elevated by a piston and cylinder assembly 40 and which forms a conventional component of the harvester 12 and pickup attachment 14.

Mounted adjacent opposite ends of the manifold 28 is a pair of inwardly and rearwardly directed air nozzles 44 supported from the rod 32 by brackets 46 with the nozzles 44 including a generally horizontally elongated discharge nozzle area 48 as illustrated in FIG. 2 with the air discharged from the nozzles 44 being directed rearwardly and inwardly toward the pickup drum 20 as illustrated in FIG. 3 thus preventing the plants in a windrow from rolling laterally from the windrow and preventing the windrow from spreading laterally as it is being picked up. The manifold 28 and the discharge nozzle 30 prevents the dried plants and pods from rolling forwardly as the plants are picked up by the pickup teeth 22 on the drum 20 as the drum rotates in a clockwise direction as observed in FIG. 2 thus assisting in the pickup teeth gently engaging and lifting the plants with the dried pods and seeds thereon over the pickup drum 20 and discharging the plants and seed onto a stripping panel or rake plate 50.

Air is supplied to the nozzle 30 and nozzles 44 from a blower 52 powered by a hydraulic motor 54 through a belt and pulley drive 56. The tangential discharge from the blower 52 extends into a hollow manifold or plenum chamber 58 having discharge pipes 60 and 62 extending horizontally therefrom and transversely across the harvester with flexible tubes or hoses 64 and 66 being connected to the nozzles 44 and manifold 28 respectively. At the other side of the machine, flexible hoses 68 and 70 interconnect the manifold 58 and the nozzles 44 and manifold 28 respectively as illustrated in FIGS. 1–3.

Figure 4:
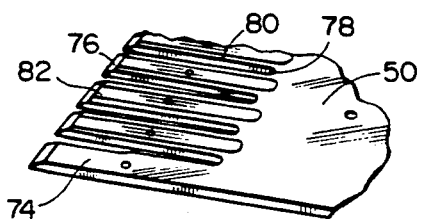
FIG. 4 is a fragmental perspective view, on an enlarged scale, illustrating the slots formed in the stripping panel or rake plate.

The stripping panel 50 extends throughout the length of the pickup drum 20 and is supported by brackets 72 with the forwardly extending end of the panel 50 being inclined upwardly as at 74 and terminating closely adjacent the periphery of the drum 20 as illustrated in FIG. 2. As illustrated in FIG. 4, the forward edge of the panel 50 is tapered or inclined at 76 and provided with a plurality of longitudinally extending slots 78 which closely receive the pickup teeth 22 a the drum 20 rotates so that the plants lifted by and engaged by the teeth 22 will be stripped from the teeth 22 and removed from the surface of the drum 20 due to the inclined configuration 76 of the forward edge of the panel 70. The teeth 22 are closely received in the slots 78. The panel 50 is of one piece construction, preferably polyethylene plastic which has self-lubricating qualities to reduce the friction between the teeth 22 and the edges of the slots 78 and the teeth 22 can also be constructed from the same plastic material to further reduce friction. The portion of the panel 20 which extends forwardly and in which the slots 78 are formed includes raised ridges 80 along the edges of the slots to form longitudinal slots or recessed areas 82 in the top surface of the portion of the panel which extends to the periphery of the drum 20 which combined with the upward inclination of the forward edge portion of the panel will form a guide for any small seed that fall from the seed pods with the inclination of the panel serving to cause the seeds to slide rearwardly toward the auger 16 forming part of the pickup attachment 14.

By using the pickup device of the present invention in association with a harvester, a very high percentage of extremely valuable seeds will be recovered by the harvester. In practice, the plants containing dried seeds and seed pods are handcut and placed in a windrow. The anti-roll manifold 28, nozzle 30 and nozzles 44 prevent the plants from rolling forward when they are engaged by the pickup teeth thereby substantially reducing the loss of seeds which occurs when plants of this type are in a windrow and are picked up by rotating teeth on a drum. Under such circumstances if no air streams are provided, some of the plants will roll off the leading edge of the pickup teeth which results in seed being knocked from the seed pods. The front manifold and front nozzle along with the two side nozzles provide anti-roll characteristics to the windrow and the two side nozzles keep the windrow from fanning out or rolling outside of the pickup device. The stripping panel is made of polyethylene plastic as are the pickup teeth with this plastic having a self-lubricating quality thereby enabling the slots to precision fit the pickup teeth with the plastic material substantially reducing friction between the rotating teeth and the edges of the slots. The top surface of the stripping panel 50 which has the slots 78 formed therein have longitudinal grooves 82 milled therein which leave the raised edges 80 to form inclined trough-like structures to receive seeds which may be dislodged from the plants as they are being stripped from the pickup teeth to guide these seeds rearwardly with inclination of the forward end of the stripping panel causing the seeds to slide to the rear toward the auger of the harvesting machine or pickup attachment.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A crop pickup device for use with a harvester in harvesting small seeds from dried plants and pods which have been placed in a windrow, said crop pickup device comprising a generally horizontally disposed, rotatably driven pickup drum for movement along a windrow, a plurality of radially extending pickup teeth mounted on said drum, means stripping plants and seeds from the drum and teeth and discharging them into a harvester, and pneumatic anti-roll means disposed solely forwardly of the pickup drum to prevent plants in the windrow from rolling forward away from the pickup drum when the pickup device is advancing along a windrow, said anti-roll means including a single transversely extending, generally horizontally disposed air manifold, an elongated slot-like discharge nozzle on said manifold discharging air rearwardly toward the pickup drum in a plane generally aligned with the rotational axis of the drum to prevent plants engaged by the teeth on the drum from rolling forwardly, said anti-roll means also including a pair of air nozzles arranged at the outer ends of the manifold and including rearwardly and inwardly directed discharge nozzles to assist in preventing forward rolling of the plants and to prevent the windrow of plants from migrating laterally outwardly when engaged by the pickup drum and teeth, and a blower mounted on the harvester and connected with the manifold and side nozzles through flexible hoses, said means for stripping plants and seeds from the pickup teeth including a stripping panel having an upwardly inclined forward edge provided with a plurality of slots receiving the pickup teeth during rotation of the drum, said slots being dimensioned to closely receive the pickup teeth with the stripping panel being constructed of a plastic material having self-lubricating characteristics, to reduce friction when the pickup teeth pass therethrough.

2. The structure as defined in claim 1 wherein the area of the upwardly inclined forward edge of the stripping panel between the slots include a longitudinal recess in the upper surface of each area to collect and guide seeds that become dislodged from the plants when the plants are stripped from the drum and teeth.

3. A crop pickup device for use with a harvester in harvesting small seeds from dried plants and pods which have been placed in a windrow, said crop pickup device comprising a generally horizontally disposed, rotatably driven pickup drum for movement along a windrow, a plurality of radially extending pickup teeth mounted on said drum, means stripping plants and seeds from the drum and teeth and discharging them into a harvester, and pneumatic anti-roll means disposed solely forwardly of the pickup drum to prevent plants in the windrow from rolling forward away from the pickup drum when the pickup device is advancing along a windrow, said anti-roll means including a horizontally disposed manifold positioned forwardly of the drum in generally parallel relation thereto and having a length equal to at least the length of the drum, said manifold including a rearwardly projecting, horizontally disposed nozzle having a length greater than one-half of the length of the rotatable drum with the nozzle generally being in the same plane as the rotational center of the drum to engage plants in opposed relation to the teeth on the drum to prevent the plants in the windrow from rolling forwardly and a pair of inwardly and rearwardly directed air discharge nozzles independent of the elongated nozzle on the manifold and disposed laterally outwardly from the ends of the manifold for directing air rearwardly and inwardly toward the rotatable drum for engaging plants in the windrow outwardly of the plants engaged by the air from the nozzle on the manifold to prevent the plants in the end portions of the windrow form rolling forwardly and migrating laterally outwardly in relation to the rotatable drum, an air blower mounted on said crop pickup device and flexible hoses connecting the outlet of the air blower to both ends of the manifold and air hoses connecting the outlet of the air blower to the rearwardly and inwardly directed nozzles thereby providing separate air supply flow paths to each of the nozzles and means supporting the nozzles adjustably in relation to the crop pickup device to enable adjustment of the nozzles and movement of the nozzles to an elevated position when not in use, said means stripping the plants and seeds from the drum and teeth including a stripping panel located rearwardly of the rotating drum and in a plane below the top of the rotating drum, the forward edge of said stripping panel being inclined upwardly and positioned adjacent the upper surface of the rotatable drum, the forward edge of said panel including a plurality of slots receiving the teeth as the drum rotates with the upward inclination of the forward edge of the stripping panel providing for gravity flow of seeds downwardly and rearwardly form the top of the drum.

* * * * *